US007321380B2

United States Patent
Iwamoto

(10) Patent No.: US 7,321,380 B2
(45) Date of Patent: Jan. 22, 2008

(54) LASER EMITTER AND LASER SCANNING DEVICE

(75) Inventor: Kazuyuki Iwamoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 10/791,902

(22) Filed: Mar. 4, 2004

(65) Prior Publication Data
US 2004/0174427 A1 Sep. 9, 2004

(30) Foreign Application Priority Data
Mar. 7, 2003 (JP) ............................. 2003-062436

(51) Int. Cl.
*B41J 27/00* (2006.01)
(52) U.S. Cl. ...................... 347/244; 347/258
(58) Field of Classification Search ................ 347/134, 347/241–245, 256–261, 118, 230, 235; 372/109; 359/204; 250/234; 309/204
See application file for complete search history.

(56) References Cited

U.S. PATENT DOCUMENTS

| 5,774,248 | A  | * | 6/1998  | Komatsu ................... 359/204 |
| 6,333,756 | B1 | * | 12/2001 | Matsushita et al. ......... 347/134 |
| 6,567,201 | B1 | * | 5/2003  | Tsuchida ................... 359/204 |
| 6,621,512 | B2 | * | 9/2003  | Nakajima et al. ........... 347/245 |
| 6,867,794 | B2 | * | 3/2005  | Cervantes ................... 347/235 |
| 6,928,100 | B2 | * | 8/2005  | Sato et al. ................... 372/109 |
| 2001/0052927 | A1 | * | 12/2001 | Takase et al. ................ 347/257 |
| 2002/0001118 | A1 |   | 1/2002  | Nakajima et al. ........... 359/204 |
| 2002/0036683 | A1 | * | 3/2002  | Yokoyama et al. ......... 347/118 |
| 2002/0075916 | A1 |   | 6/2002  | Sato et al. ..................... 372/36 |
| 2003/0173508 | A1 | * | 9/2003  | Tanaka et al. ............... 250/234 |

FOREIGN PATENT DOCUMENTS

| JP | 9-146024 | 6/1997 |
| JP | 2000-131634 | 5/2000 |
| JP | 2000-292723 | 10/2000 |
| JP | 2002-189180 | 7/2002 |
| JP | 2003195207 A * | 7/2003 |

* cited by examiner

*Primary Examiner*—Hai Pham
(74) *Attorney, Agent, or Firm*—Fitzpatrick, Cella, Harper & Scinto

(57) ABSTRACT

A laser emitter including: a first lens barrel portion for holding a first laser element; a second lens barrel portion for holding a second laser element whose optical axis is slanted with respect to an optical axis of the first lens barrel portion, the second lens barrel portion being provided as one unit with the first lens barrel portion; a first lens supporting portion provided at the tip of the first lens barrel portion to support a first collimator lens; and a second lens supporting portion provided at the tip of the second lens barrel portion to support a second collimator lens, in which the first and second lens supporting portions are capable of supporting the collimator lenses with an adjustment range stretching in an optical axis direction, and the first and second collimator lenses are fixed and supported at positions adjusted within the adjustment range.

5 Claims, 10 Drawing Sheets

LASER EMITTER AND LASER SCANNING DEVICE

BACKGROUND OF THE INVENTION

1. Field of the Invention

The present invention relates to a laser emitter and a laser scanning device suitable for an image exposure device that is provided in an image forming apparatus such as an electrophotographic copying machine or printer to expose a photosensitive body to light.

2. Related Background Art

A description is given on background art of the present invention with reference to FIGS. 9 to 14. FIG. 9 shows an image forming apparatus for printing a color image. The image forming apparatus has an independent image bearing member (hereinafter referred to as photosensitive drum) 120 for each of four colors, that is, yellow, magenta, cyan, and black. The photosensitive drum 120 is an electric conductor with a photosensitive layer formed thereon by application, and forms an electrostatic latent image upon receiving laser light that is emitted from a scanning optical device. The image forming apparatus also has: a scanning optical device 121 for radiating laser light in accordance with image information that is sent from an image reading device (not shown), personal computer or the like; a developing unit 122 for forming a toner image on a photosensitive drum using toner which is charged by friction; an intermediate transfer belt 123 for carrying the toner image on the photosensitive drum to a sheet of transfer paper; a sheet feeding cassette 124 for storing sheets of paper to which toner images are to be transferred; a fixing unit 125 for fixing the transferred toner images to the paper by heat; a sheet delivery tray 126 on which sheets of transfer paper with images fixed thereon are stacked; and a cleaner 127 for cleaning toner that remains on the photosensitive drum.

To form an image, the photosensitive drum 120 is irradiated with laser light which is emitted from the scanning optical device 121 in accordance with image information. This causes a charger to charge the photosensitive drum 120, which then forms an electrostatic latent image. After that, toner charged by friction in the developing unit 122 adheres to the electrostatic latent image to form a toner image on the photosensitive drum 120. The toner image is transferred from the photosensitive drum 120 to the intermediate transfer belt 123, and then re-transferred to a sheet of paper that has been fed from the sheet feeding cassette 124 which is placed in a lower part of the main body of the apparatus. An image is thus formed on the paper. The sheet of paper to which the image is transferred is sent to the fixing unit 125 to fix toner and is discharged onto the sheet delivery tray.

FIG. 10 is a diagram of an image forming portion of FIG. 9 and, since the image forming portion has a symmetrical shape, the symbols used in FIG. 9 are shown on only one side of the unit. The scanning optical device 121 of FIG. 9 emits laser light in accordance with image information, so that an electrostatic latent image is formed on the photosensitive drum 120 by the laser light after the laser light passes through a rotary multi-facet mirror 128, fθ lenses 129 and 130, turn-back mirrors 131a to 131d, and a dust-proof glass enclosure 132. The rotary multi-facet mirror (hereinafter referred to as polygon mirror) 128 is provided for deflection scanning of the laser light. The fθ lenses 129 and 130 are provided to let the laser light run at a constant speed and form a spot on the drum. The turn-back mirrors 131a to 131d are for reflecting the laser beam in a given direction. The dust-proof glass enclosure 132 is provided to protect the scanning optical device 121 from dust. The scanning optical device 121 is placed near the photosensitive drum 120 with the advent of the fashion of scanning optical devices of nowadays which have stopped irradiating photosensitive drums from afar as image forming apparatuses themselves have been reduced in size. As shown in FIG. 10, the scanning optical device 121 employs a method of using one polygon motor unit to irradiate four photosensitive drums, and forms two scanning groups for irradiating opposing faces of the polygon mirror 128 with plural laser beams each. The turn-back mirrors 131a to 131d are used to make the unit compact, and are each a mold lens in which two lenses are pasted together or two light paths are unitarily formed in order to let laser beams on two different light paths image on a photosensitive drum. In this collimating optics, a deflection plane for deflection scanning of laser light is necessary for each light path. Therefore, a thick polygon mirror or a two-stage structure polygon mirror is employed in this system.

In contrast to an optical system that uses such a polygon mirror as the one described above, there is an optical system as the one shown in FIG. 11 which uses a thin polygon mirror 133 to obtain a thinner shape. In this optical system, laser beams enter and exit the polygon mirror 133 at different angles in a sub-scanning direction so that beams for irradiating photosensitive drums are split at a point where the beams are spaced at regular intervals from one another. Laser light is run for deflection scanning with the use of the polygon mirror 133 and then is transmitted through common fθ lenses 135 and 136. After that, each laser beam passes through two turn-back mirrors and one concave mirror 134b or 134e and is applied to its associated photosensitive drum. To split laser light, a laser beam that is run on the lower side in FIG. 11 by deflection scanning is reflected upward in FIG. 11 toward an inner photosensitive drum by a turn-back mirror 134d, which is placed at a point in the light path of the laser beam, so that the laser beam intersects a laser beam that is run on the upper side by deflection scanning, and the reflected light is then radiated onto the photosensitive drum by turn-back mirrors 134e and 134f, which are placed in an upper part of the scanning optical device. In the optical system of FIG. 11 where light is incident obliquely, the fθ lenses, having a refractive power in the main scanning direction, work like the collimating optics described above and therefore can be arranged as in the collimating optics. On the other hand, in principle, it is difficult for the fθ lenses of FIG. 11 to assuredly condense light in the sub-scanning direction on a photosensitive drum since light enters the lenses obliquely with respect to the optical axes of the lenses.

It is for this reason that the concave mirrors 134b and 134e are necessarily provided to condense laser beams in the sub-scanning direction after each laser light is split (the same effect is obtained if these concave mirrors are replaced by third imaging lenses each having a refractive power in the sub-scanning direction).

There has been proposed also a modification of the above oblique incident optical system that needs to place four imaging optical elements in total in one group downstream of the polygon mirror. The modified oblique incident optical system is reduced in number of optical elements, and has an fθ lens as a second imaging lens placed downstream of the point where each laser light is split. This structure needs the second imaging lens for each laser light but no concave mirror or third imaging lens, and is therefore capable of condensing laser light on a photosensitive drum with three imaging optical elements. As a result, a scanning optical device having this structure is smaller in size than the above-described oblique incident optical system that uses concave mirrors or third imaging lenses.

Such an optical system where light in a sub-scanning direction is incident obliquely has four laser light sources corresponding to four photosensitive drums. The symmetrical optical system shown in FIG. 11 are composed of two lens barrel portions 153 and 154, which hold two light sources 151 and 152, respectively, two collimator lenses 155 and 156, and two electric circuit substrates 157 and 158 for causing emission of laser light. Those laser light sources are placed side by side in the sub-scanning direction at a distance as shown in a sectional view in the sub-scanning direction of FIG. 13, or placed off the sub-scanning direction with the use of a turn-back mirror 159 as shown in a top view of FIG. 14.

However, the structures of FIGS. 13 and 14 both have problems. To place the laser light sources side by side in the sub-scanning direction at a distance as shown in FIG. 13, the length of the incident optical system from the laser light sources to the polygon mirror has to be set long since a short distance between the laser light sources causes the lens barrel portions to interfere with each other. This increases the size of the scanning optical device.

The structure of FIG. 14 which uses the turn-back mirror to place the laser light sources off the sub-scanning direction is free from the above problem of increasing the scanning optical device in size, but the use of the turn-back mirror increases the number of parts and accordingly cost.

SUMMARY OF THE INVENTION

The present invention has been made in view of the above, and an object of the present invention is to provide a laser emitter that is reduced in size.

Another object of the present invention is to provide a laser emitter that has fewer parts and can achieve high laser position precision.

Still another object of the present invention is to provide a laser emitter including:

a first lens barrel portion for holding a first laser element;

a second lens barrel portion for holding a second laser element whose optical axis is slanted with respect to an optical axis of the first lens barrel portion, the second lens barrel portion being provided as one unit with the first lens barrel portion;

a first lens supporting portion provided at the tip of the first lens barrel portion to support a first collimator lens; and a second lens supporting portion provided at the tip of the second lens barrel portion to support a second collimator lens, in which the first and second lens supporting portions are capable of supporting the collimator lenses with an adjustment range stretching in an optical axis direction, and the first and second collimator lenses are fixed and supported at positions adjusted within the adjustment range.

Still another object of the present invention is to provide a laser scanning device including:

a laser unit for emitting first and second laser beams, the laser unit having: a first lens barrel portion for holding a first laser element that emits the first laser beam; a second lens barrel portion for holding a second laser element that emits the second laser beam whose optical axis is slanted with respect to the optical axis of the first laser beam; a first lens supporting portion provided at the tip of the first lens barrel portion to support a first collimator lens; and a second lens supporting portion provided at the tip of the second lens barrel portion to support a second collimator lens, the first and second lens supporting portions being capable of supporting the collimator lenses with an adjustment range stretching in an optical axis direction, the first and second collimator lenses being fixed and supported at positions adjusted within the adjustment range; and a rotary mirror for running the first and second laser beams, which are brought close to each other by exiting the laser unit, together.

Further objects of the present invention will be apparent from the description below.

DESCRIPTION OF THE PREFERRED EMBODIMENTS

Hereinafter, the present invention is described with reference to embodiments shown in the accompanying drawings.

Embodiment 1

Figure 9:
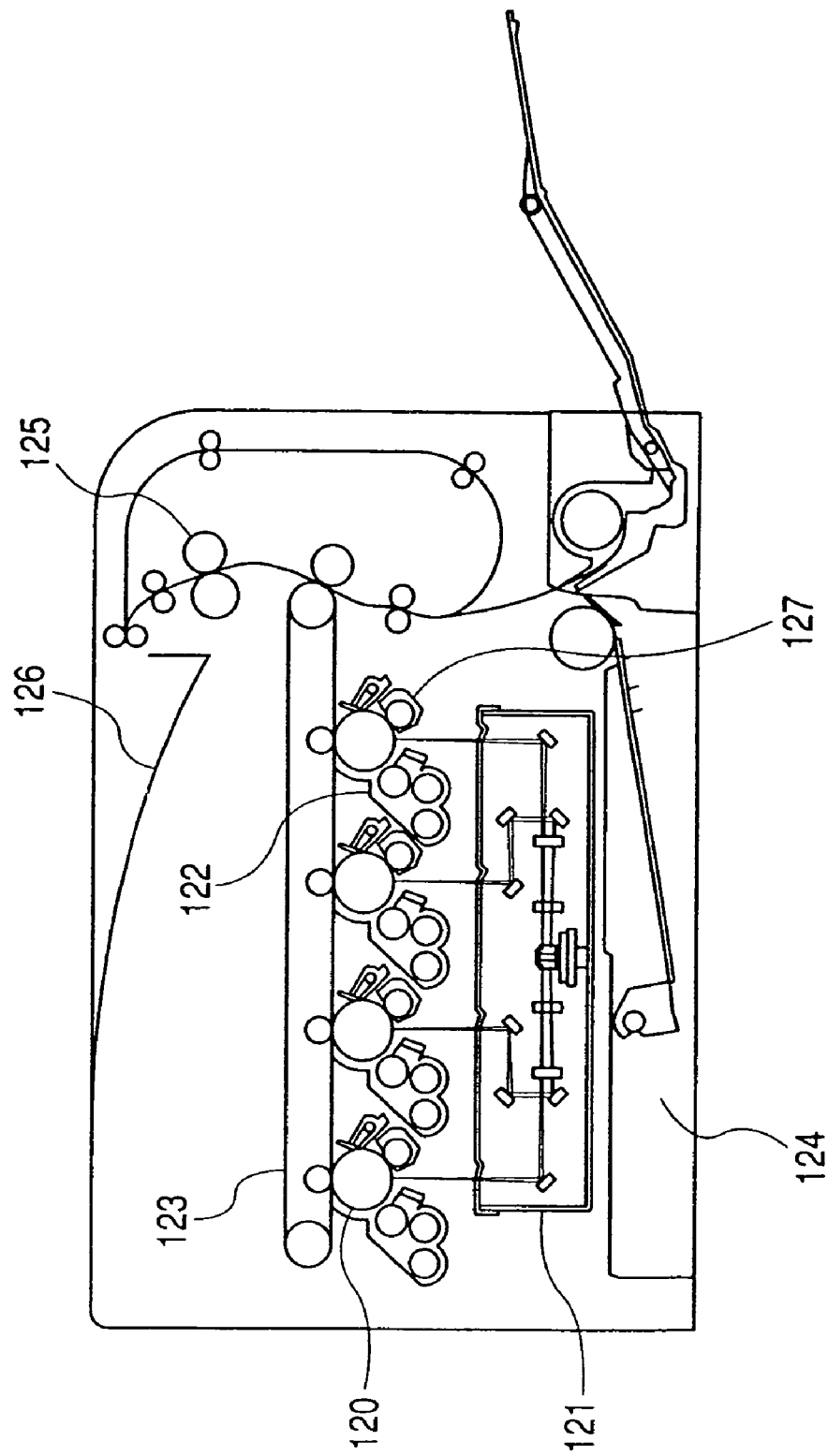
FIG. 9 is a schematic sectional view of an image forming apparatus.
Figure 10:
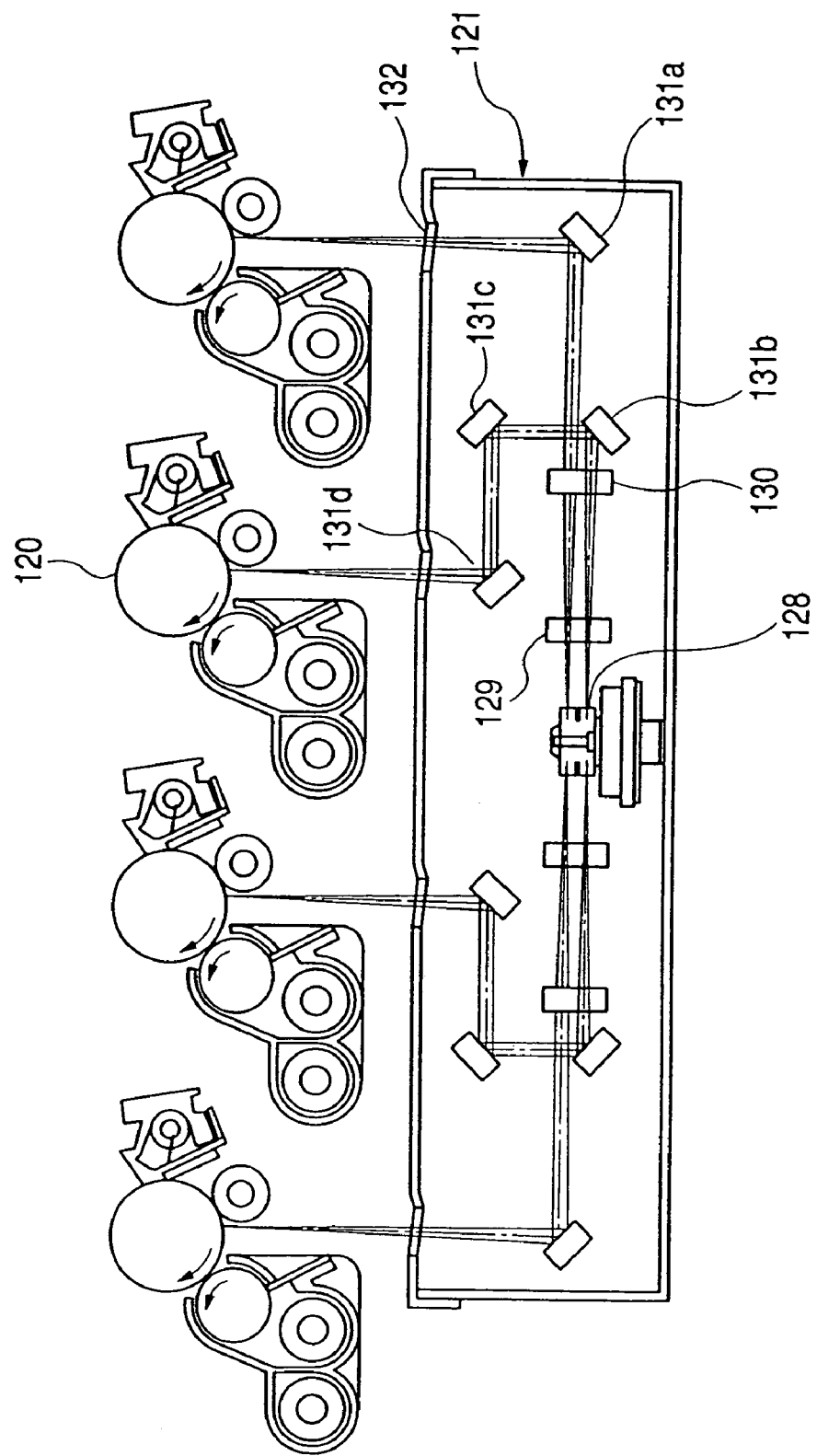
FIG. 10 is a schematic sectional view of an image forming portion of the image forming apparatus shown in FIG. 9, the image forming portion being composed of a scanning optical device, photosensitive drums, and others.
Figure 11:
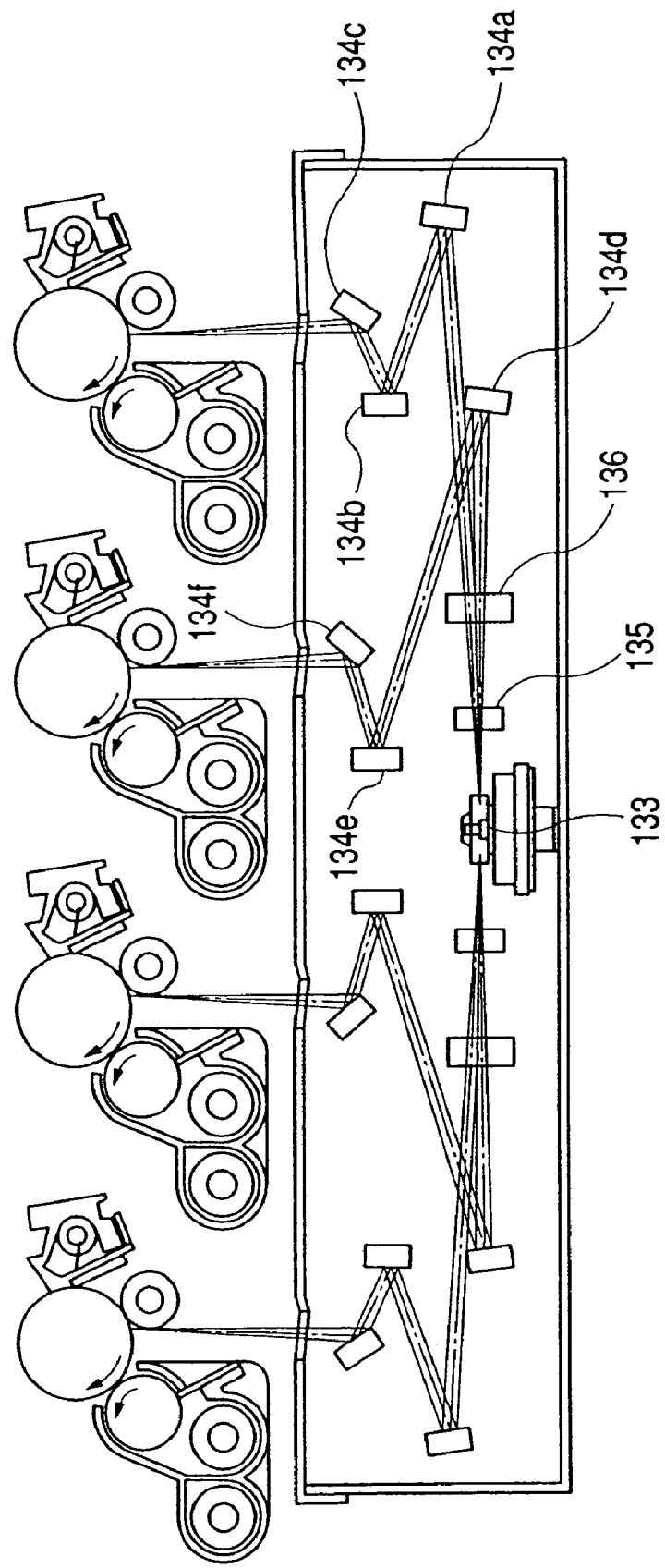
FIG. 11 is a schematic sectional view of an image forming portion composed of a different scanning optical device, photosensitive drums, and others.

A description is given below with reference to FIG. 1 through FIGS. 6A and 6B on a scanning optical device according to Embodiment 1 of the present invention. A scanning optical device of the present invention which is described in this embodiment and the subsequent embodiment is mounted to an image forming apparatus as shown in FIG. 9 and irradiates a photosensitive drum with laser light in accordance with image information, so that an electrostatic latent image is formed. The rest of the image forming apparatus structure is as described in Related Background Art, and accordingly any description thereof is omitted here. A scanning optical device of the present invention can be applied to an electrophotographic copying machine and other types of image forming apparatuses.

Figure 1:
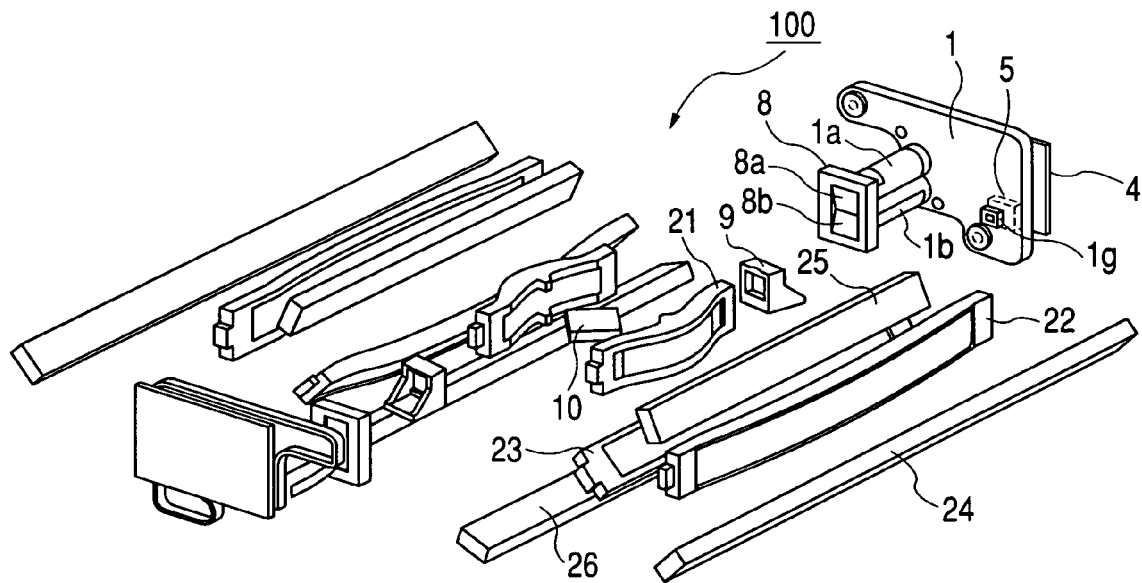
FIG. 1 is a perspective view showing the entire structure of a scanning optical device according to Embodiment 1 of the present invention.
Figure 2:
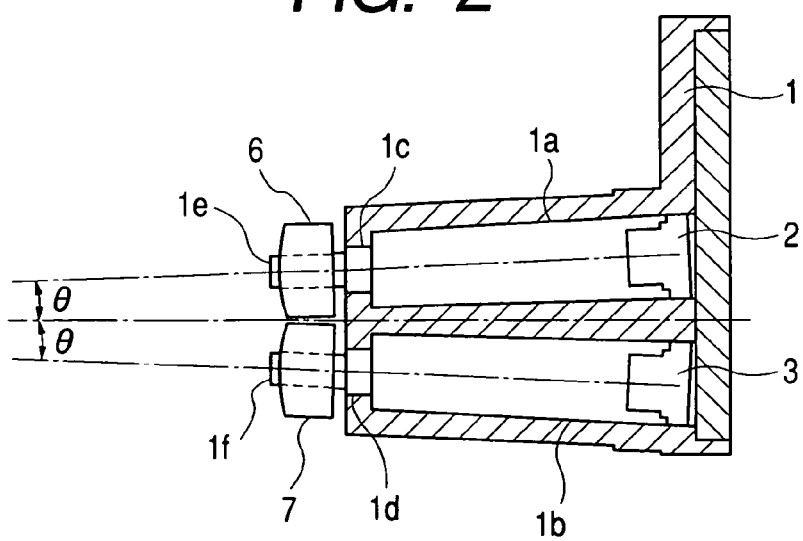
FIG. 2 is a sectional view of a laser holder portion according to Embodiment 1 of the present invention.
Figure 3:
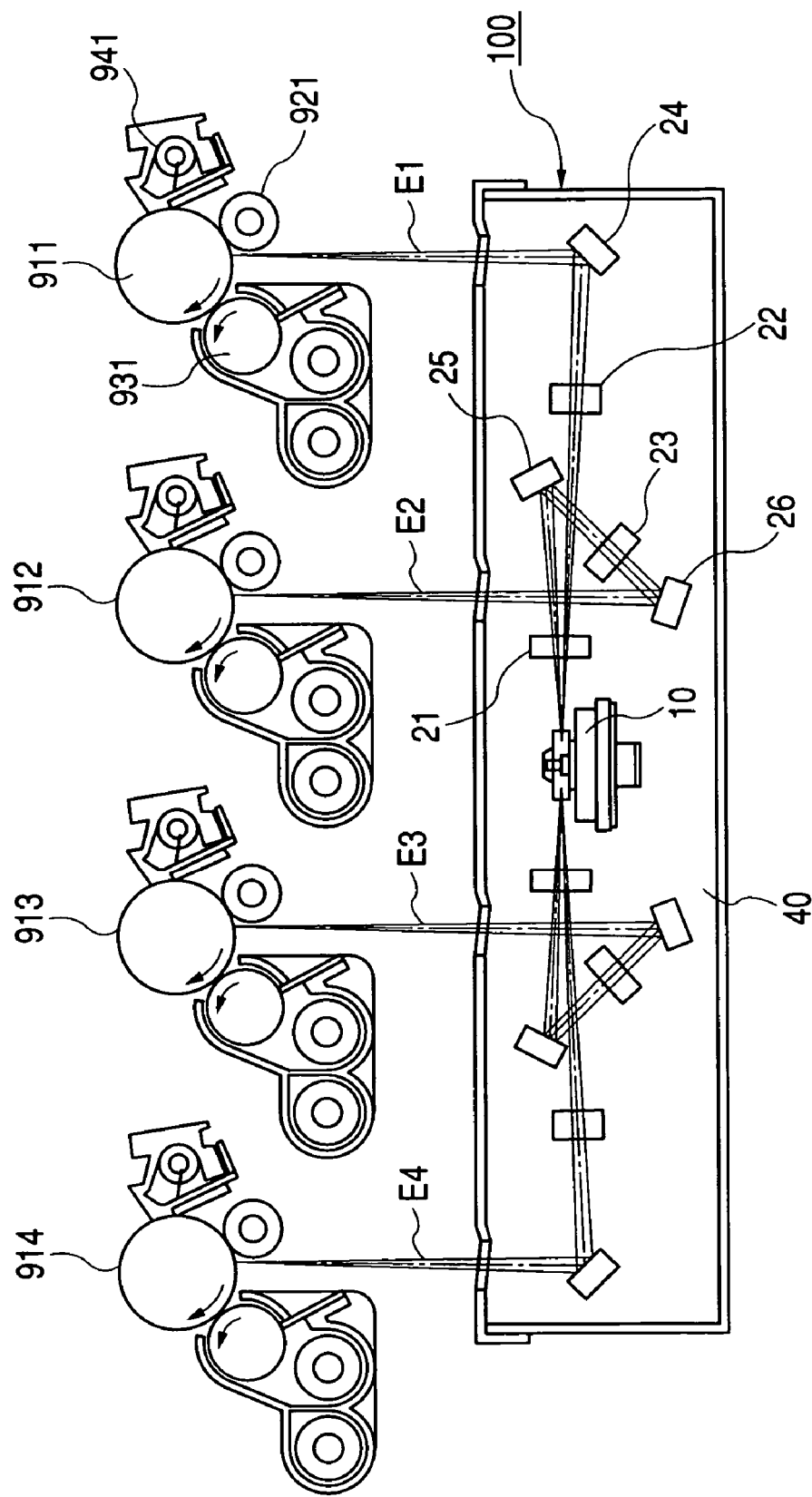
FIG. 3 is a schematic sectional view of an image forming portion which is composed of a scanning optical device according to an embodiment of the present invention, photosensitive drums, and others.
Figure 4A:
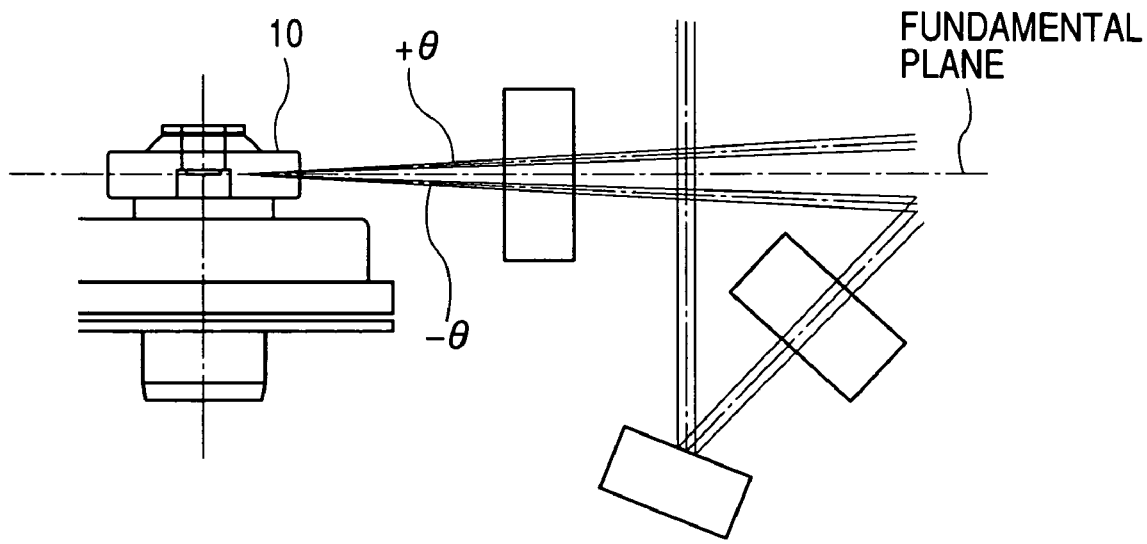
FIGS. 4A and 4B are partial sectional views showing light paths of a polygon mirror portion according to an embodiment of the present invention.
Figure 4B:
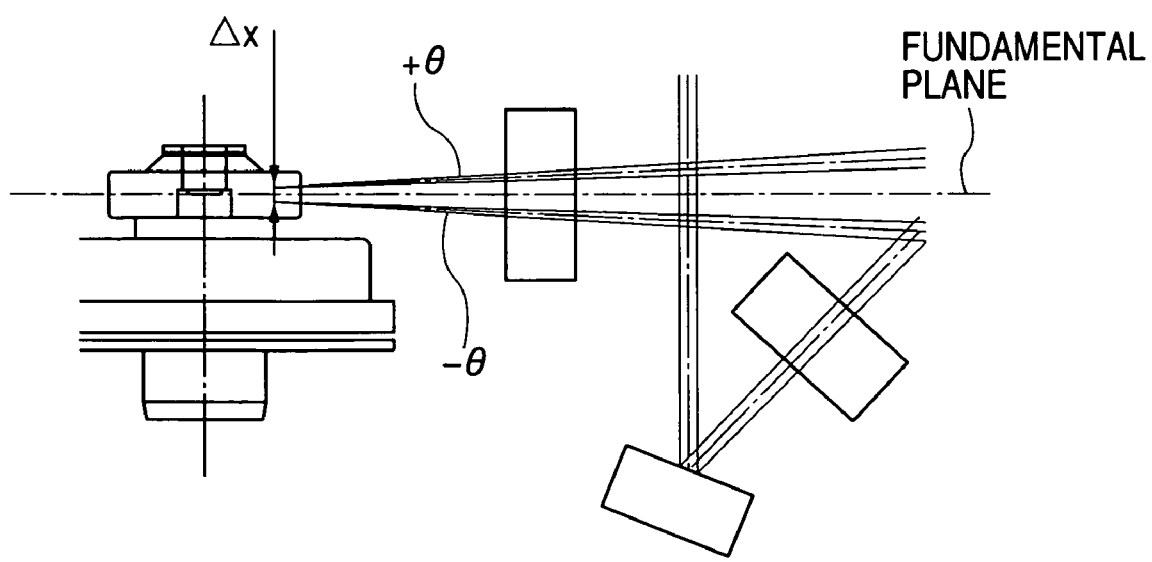
Figure 5:
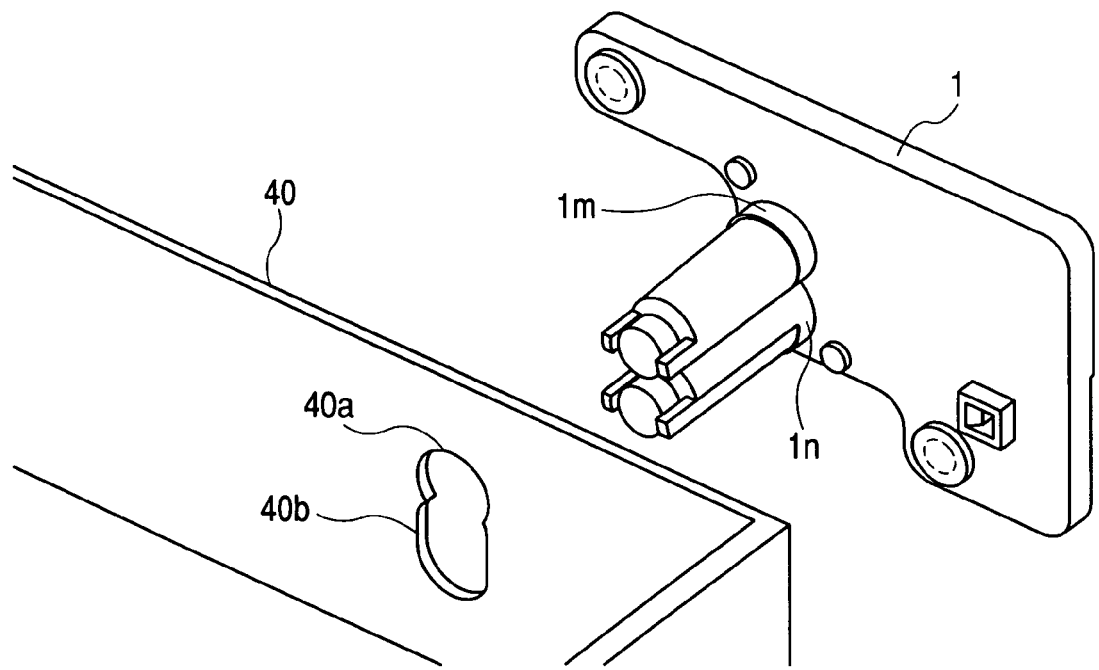
FIG. 5 is a partial perspective view showing how a laser holder portion according to an embodiment of the present invention is attached.
Figure 6A:
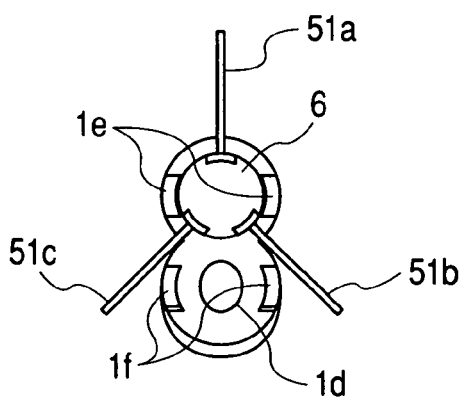
FIGS. 6A and 6B are explanatory diagrams illustrating adjustment of collimator lenses according to an embodiment of the present invention.
Figure 6B:
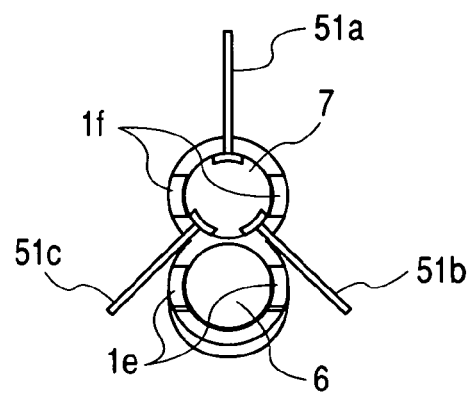

FIG. 1 is a perspective view showing the entire structure of a scanning optical device 100 according to Embodiment 1. FIG. 2 is a sectional view of a laser holder portion. FIG. 3 is a schematic sectional view of an image forming portion which is composed of the scanning optical device, photosensitive drums, and others. FIGS. 4A and 4B are partial sectional views showing light paths of a polygon mirror portion. FIG. 5 is a partial perspective view showing how the laser holder portion is attached. FIGS. 6A and 6B are explanatory diagrams illustrating adjustment of collimator lenses.

Figure 12:
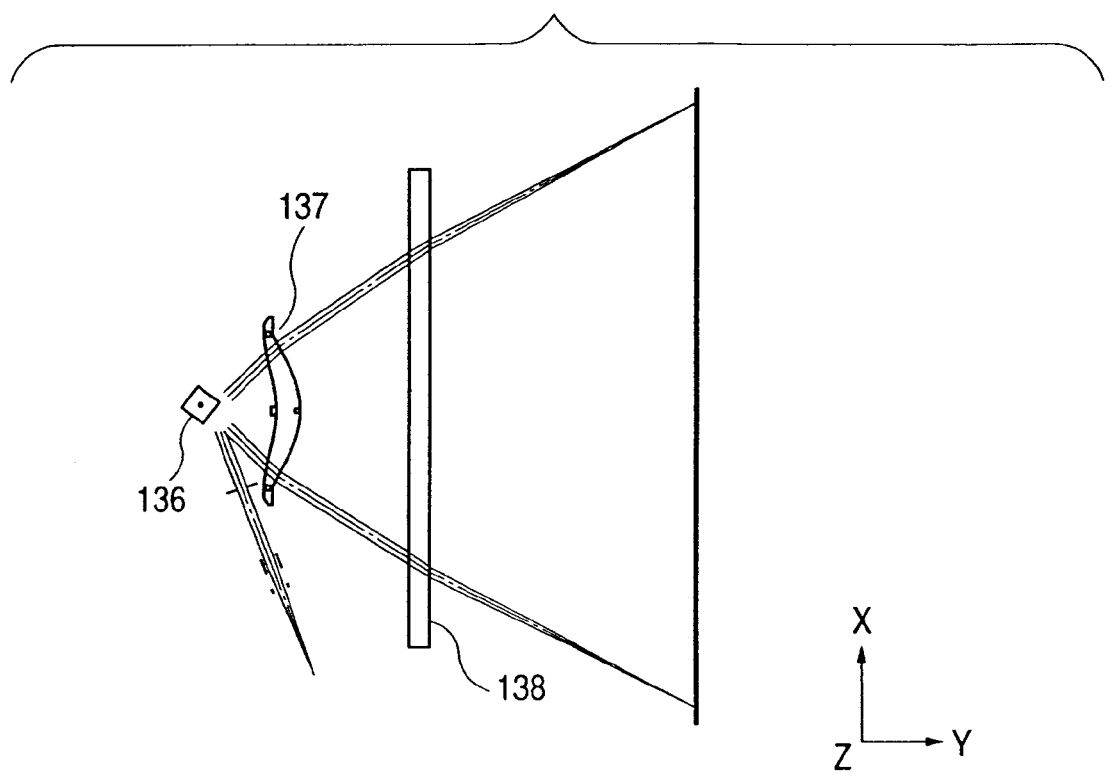
FIG. 12 is an explanatory diagram of a laser light flux directed at a photosensitive drum.
Figure 13:
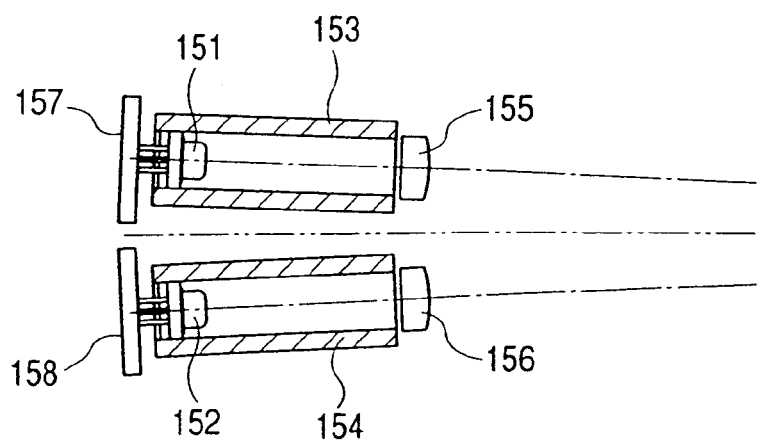
FIG. 13 is a sectional view in a sub-scanning direction of the image forming apparatus of FIG. 9 showing arrangement of a laser holder portion.
Figure 14:
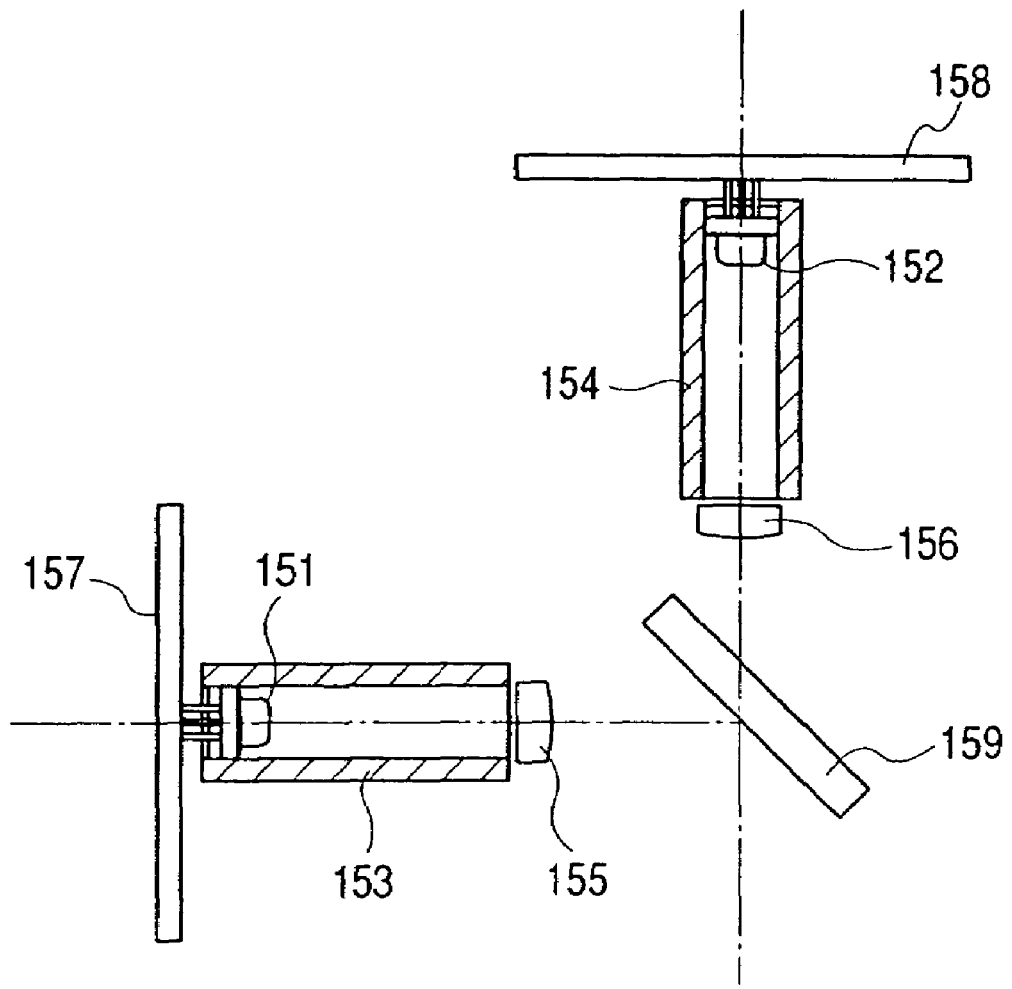
FIG. 14 is a top view showing another example of arranging the laser holder portion.

In Embodiment 1, the scanning optical device 100 is placed under photosensitive drums 911 to 914 and others. The scanning optical device 100 used in this embodiment has one polygon mirror 10, and two fluxes of laser light enter the polygon mirror 10 on each side to expose the photosensitive drums 911 to 914 to irradiation light beams E1 to E4. The thin polygon mirror 10 is employed to make the scanning optical device 100 an oblique incident optical system that is small in size. After exiting the polygon mirror 10, fluxes of laser light have to be split and take upper and lower light paths. Therefore, their incident angles are equal to each other in magnitude (θ) but opposite in direction with respect to a fundamental plane, which is a plane defined by the normal line of the polygon mirror face and the polygon rotation direction as shown in FIG. 4A (the fundamental plane corresponds to the X-Y plane in FIG. 12). In general, the relative angle between the fundamental plane and deflection scanning light is preferably 3° or less from the viewpoint of image performance and this embodiment follows this notion. In this embodiment, oblique incident angles of laser light fluxes are equal in magnitude to each other and opposite in direction with respect to the fundamental plane in order to match optical characteristics. According to the optical arrangement of this embodiment, the polygon mirror 10 is placed at the center and optical paths leading to the photosensitive drums 911 to 914 are symmetrical with respect to the rotation center of the polygon mirror 10. Therefore, the scanning group of the irradiation light beams E1 and E2 alone is described here.

In FIGS. 1 and 2, Reference Symbol 1 denotes a laser holder (lens barrel member). The laser holder 1 has semiconductor lasers (single beam lasers) 2 and 3, each of which is a light source having one light emission point in one housing (package), held by press fit in lens barrel holding portions (lens barrel portions) 1a and 1b. Reference Symbol 4 denotes an electric circuit substrate, which is electrically connected to the semiconductor lasers 2 and 3 and has a laser driver circuit. Reference Symbol 5 denotes a beam detecting sensor (BD sensor) as synchronization detecting means provided on the electric circuit substrate 4. The BD sensor 5 detects a light flux reflected by the polygon mirror 10 which will be described later and outputs a synchronization signal in a main scanning direction to thereby adjust scanning start timing at an end of an image. The lens barrel holding portions 1a and 1b are provided so as to slant optical axes such that the light paths of the semiconductor lasers 2 and 3 intersect each other in a sub-scanning direction at a given angle θ. The contours of the lens barrels are partially integrated with each other. This makes it possible to hold the semiconductor lasers 2 and 3 across a short distance from each other. Diaphragm portions 1c and 1d are provided at the tips of the lens barrel holding portions 1a and 1b for the semiconductor lasers 2 and 3, respectively, and shape light fluxes emitted from the semiconductor lasers 2 and 3 into desired, optimum, beam shapes. Provided at the tips of the lens barrel holding portions 1a and 1b beyond the diaphragm portions 1c and 1d in the main scanning direction are bonding portions 1e and 1f of collimator lenses 6 and 7. The collimator lenses 6 and 7 convert light fluxes that have passed through the diaphragm portions 1c and 1d into approximately parallel pencils of light. As shown in FIG. 6A, the collimator lens 6 is securely held at three points by adjustment chucking portions 51a, 51b, and 51c. In this state, the irradiation position and pint of the collimator lens 6 are adjusted in the directions of three axes, X, Y, and Z, while optical characteristics of laser light are being detected. Once the position of the collimator lens 6 is determined, the collimator lens 6 is bonded and fixed to the bonding portion 1e by irradiating a UV-curable adhesive with an ultraviolet ray. Similarly, the collimator lens 7 is adjusted as shown in FIG. 6B by rotating the laser holder 1 by 180° and, once the position is set, is bonded and fixed to the bonding portion 1f.

The bonding portions 1e and 1f of the collimator lenses 6 and 7 are thus provided in the main scanning direction, and this makes it possible to adjust and bond the collimator lenses 6 and 7 in three axial directions relative to the laser holder 1, which has lens barrels unified while being held close to each other.

Reference Symbol 40 denotes an optical case for housing optical parts of the scanning optical device 100. As shown in FIG. 5, a side wall of the optical case 40 has in the sub-scanning direction a fitting hole 40a and an elongated hole 40b for positioning the laser holder 1. The laser holder 1 is attached to the optical case 40 by fitting portions 1m and 1n, which are provided in the outer peripheries of the lens barrel holding portions 1a and 1b, into the holes 40a and 40b, respectively. The semiconductor lasers 2 and 3 can be positioned with high precision relative to the optical parts housed in the optical case 40 since the laser holder 1 is attached to the optical case 40 by fitting in the case's wall the fitting portions 1m and in provided in the outer peripheries of the lens barrel holding portions 1a and 1b, which hold the semiconductor lasers 2 and 3 and form light paths.

Reference Symbol 8 denotes a cylindrical lens having a given refractive power only in the sub-scanning direction. The cylindrical lens 8 has unitarily formed lens portions 8a and 8b to handle light fluxes emitted from the semiconductor lasers 2 and 3, respectively. Reference Symbol 9 represents a BD lens for imaging, on a light receiving face of the BD sensor 5, light fluxes that have been reflected by the polygon mirror 10. Placed right in front of the BD sensor 5 is a BD slit portion 1g, which is opened in the laser holder 1. The BD slit portion 1g is an opening that is narrow in the main scanning direction and long in the sub-scanning direction, so that light fluxes in the main scanning direction can be detected with high precision by restricting a light flux received by the BD sensor 5 to the main scanning direction. In this embodiment, the BD sensor 5 and the BD slit portion 1g are positioned to correspond to the semiconductor laser 2 and there is no BD sensor that is associated with the semiconductor laser 3. This is because the semiconductor lasers 2 and 3 are provided in the single laser holder 1 in the sub-scanning direction and accordingly are identical to each other in terms of scanning start timing at an end of an image.

A motor (not shown) of the polygon mirror 10 is rotated at a constant speed to thereby run light fluxes which have been emitted from the semiconductor lasers for deflection scanning. Reference Symbol 21 denotes a first imaging lens. The first imaging lens 21 is an fθ lens and, similar to second imaging lenses 22 and 23, runs laser light at a constant speed and causes laser beams to form spots on the photosensitive drums 911 and 912. A cylinder lens is used for the first imaging lens 21 since light fluxes emitted from the semiconductor lasers 2 and 3 enter the first imaging lens 21 at angles different from each other. The second imaging lens 22 placed to handle a light flux from the semiconductor laser 2 and the second imaging lens 23 placed to handle a light flux from the semiconductor laser 3 are used to image laser light in the sub-scanning direction. Denoted by 24 to 26 are turn-back mirrors for reflecting light fluxes in given directions. The mirror 24 is the last turn-back mirror placed to handle a light flux from the semiconductor laser 2. The mirror 25 is a turn-back mirror for splitting and is placed to handle a light flux from the semiconductor laser 3. The mirror 26 is the last turn-back mirror placed to handle a light flux from the semiconductor laser 3. As shown in FIGS. 4A and 4B, light fluxes may be reflected at the same point on the surface of the polygon mirror 10 or may be at different points on the mirror surface which are offset from each other along the height of the polygon mirror 10. When reflection points on the polygon mirror 10 are offset from each other as shown in FIG. 4B, the position of the splitting turn-back mirror 25 on the near side can be moved nearer. Here, the polygon mirror 10 corresponds to scanning means, and scanning optical means is composed of the polygon mirror 10, the first imaging lens 21, the second imaging lenses 22 and 23, and the turn-back mirrors 24 to 26.

The photosensitive drum 911 is an electric conductor with a photosensitive layer formed thereon by application. Reference Symbol 921 denotes a charger for charging the photosensitive drum to a given electric potential. Reference Symbol 931 denotes a developing unit for forming a toner image on an electrostatic latent image. Denoted by 941 is a cleaner for cleaning toner that remains on the photosensitive drum. Other photosensitive drums 912 to 914 are similarly structured.

Described is the part where light fluxes emitted from the semiconductor lasers 2 and 3 are run as the irradiation light beams E1 and E2 on the photosensitive drums 911 and 912.

Light fluxes emitted from the semiconductor lasers 2 and 3 are limited in size in flux section by the diaphragm portions 1c and 1d of the laser holder 1, and then converted into approximately parallel pencils of light by the collimator lenses 6 and 7 before entering the lens portions 8a and 8b of the cylindrical lens 8. Of the light fluxes incident on the cylindrical lens 8, a component within the main scanning section is transmitted as it is whereas a component within the sub-scanning section is converged to form an approximately linear image on the same face of the polygon mirror 10. At this point, the light enters obliquely at the angle θ in the sub-scanning direction. Then, the polygon mirror 10 is rotated for deflection scanning, causing the laser beams to exit in the sub-scanning direction at the angle θ. Of the two light fluxes that have exited the polygon mirror 10, the light flux emitted from the semiconductor laser 2 is received by the BD sensor 5 through the BD slit portion 1g provided in the laser holder 1. The BD slit portion 1g restricts the light flux to the main scanning direction, thereby making it possible to detect a light flux in the main scanning direction with high precision. The BD sensor 5 detects the light flux emitted from the semiconductor laser 2 and outputs a synchronization signal to adjust the scanning start timings by the semiconductor lasers 2 and 3 at an end of an image. The scanning start timing by the semiconductor laser 3 at an end of an image can be identical to the scanning start timing by the semiconductor laser 2 at an end of an image since the semiconductor lasers 2 and 3 are provided in the single laser holder 1 in the sub-scanning direction. In this way, light emission by the semiconductor laser 3 is timed with light emission by the semiconductor laser 2. Light fluxes emitted from the semiconductor lasers 2 and 3 in sync with each other are transmitted through the first imaging lens 21. After that, the light flux emitted from the semiconductor laser 2 is transmitted through the second imaging lens 22 and is reflected by the last turn-back mirror 24 to be run and imaged on the photosensitive drum 911 as the irradiation light beam E1. On the other hand, the light flux emitted from the semiconductor laser 3 is reflected downward by the splitting turn-back mirror 25, transmitted through the second imaging lens 23, and reflected by the last turn-back mirror 26 to be run and imaged on the photosensitive drum 912 as the irradiation light beam E2.

As described above, the semiconductor lasers 2 and 3 are held by press fit in the lens barrel holding portions 1a and 1b of the laser holder 1 which are integrated with each other with the optical axes slanted, thereby making it possible to hold the semiconductor lasers 2 and 3 across a short distance from each other. At the same time, the collimator lenses 6 and 7 are each adjusted in three axial directions before bonded and fixed to thereby make it possible to shorten the light path length of an incident optical system that stretches to the polygon mirror 10 while optical characteristics of the semiconductor lasers 2 and 3 meet requirements.

In addition, the BD sensor 5, which is placed at a position corresponding to the semiconductor laser 2, and the BD slit portion 1g, which is opened in the laser holder 1 holding the semiconductor lasers 2 and 3 by press fit in the lens barrel holding portions 1a and 1b, make it possible to keep the positional relation without causing dimensional tolerance of the semiconductor lasers 2 and 3 and the BD slit portion 1g to influence much. This enables the BD sensor 5 to detect a light flux with high precision. Furthermore, the scanning optical device is capable of matching the scanning start timing by the semiconductor laser 3 at an end of an image to the scanning start timing by the semiconductor laser 2 at an end of an image without providing a BD sensor for the semiconductor laser 3.

Moreover, the semiconductor lasers 2 and 3 can be positioned with high precision relative to the optical parts housed in the optical case 40 since the laser holder 1 is attached to the optical case 40 by fitting the fitting portions 1m and 1n provided in the outer peripheries of the lens barrel holding portions 1a and 1b, which hold the semiconductor lasers 2 and 3 and form light paths, in the fitting hole 40a and the elongated hole 40b, which are opened in the side wall of the optical case 40 in the sub-scanning direction.

Moreover, with the bonding portions 1e and 1f of the collimator lenses 6 and 7 placed in the main scanning direction, the adjustment chucking portions 51a, 51b, and 51c can solidly hold the collimator lenses at three points without interfering with the bonding portions 1e and 1f and with the collimator lenses that have previously been bonded and fixed. This makes it possible to adjust and bond the collimator lenses 6 and 7 in three axial directions relative to the laser holder 1, which has lens barrels unified while being held close to each other. Moreover, since the collimator lenses 6 and 7 are adjusted and bonded by rotating the laser holder 1 by 180°, the same adjusting and bonding device can be used even when the light paths are slanted in the sub-scanning direction at the angle θ. Unnecessary investment in equipment thus can be avoided.

Embodiment 2

Figure 7:
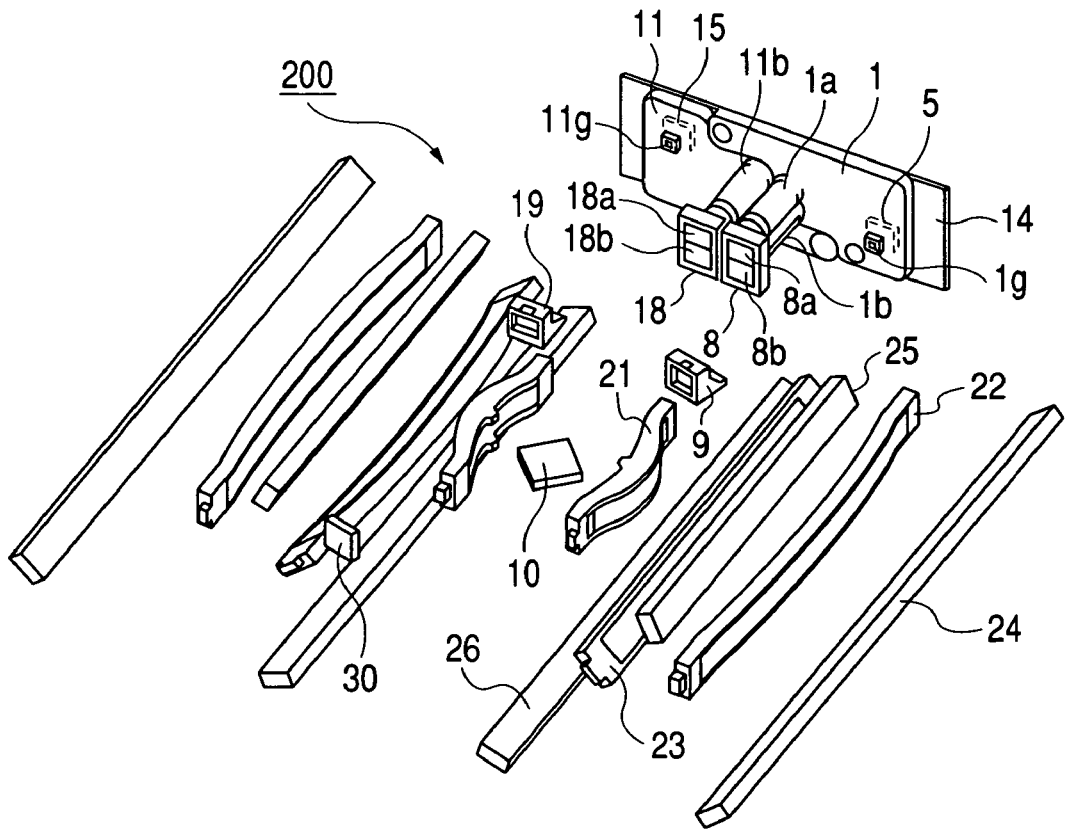
FIG. 7 is a perspective view showing the entire structure of a scanning optical device according to Embodiment 2 of the present invention.
Figure 8:
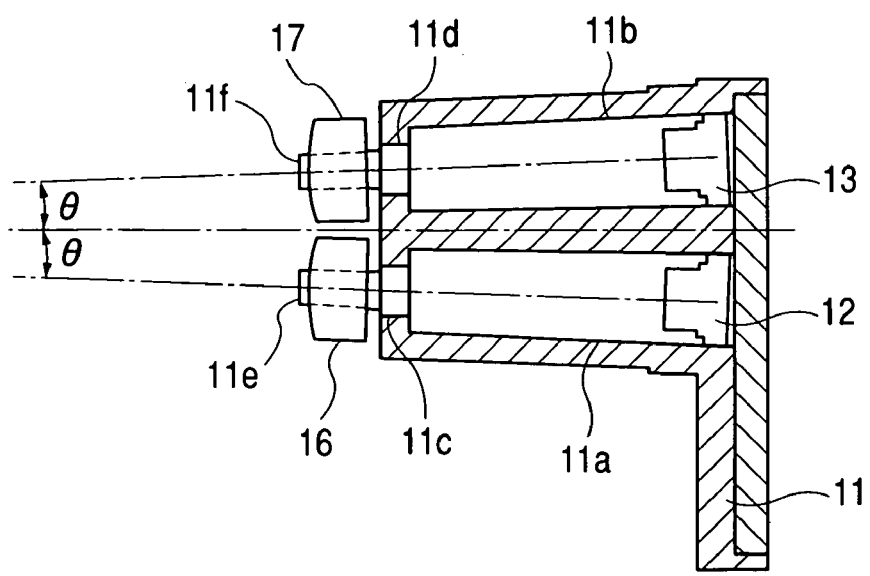
FIG. 8 is a sectional view of a laser holder portion according to Embodiment 2 of the present invention.

A description is given below with reference to FIGS. 7 and 8 on a scanning optical device according to Embodiment 2 of the present invention. FIG. 7 is a perspective view showing the entire structure of a scanning optical device 200 according to Embodiment 2. FIG. 8 is a sectional view of a laser holder portion.

In Embodiment 2, the same components as those of Embodiment-1 are denoted by the same reference symbols and any description thereof will be omitted.

In FIGS. 7 and 8, Reference Symbol 11 denotes a laser holder (lens barrel member), which is identical to the laser holder 1. The laser holder 11 has semiconductor lasers 12 and 13, each of which is a light source having one light emission point in one housing (package), held by press fit in lens barrel holding portions (lens barrel portions) 11a and 11b. Reference Symbol 14 denotes an electric circuit substrate, which is electrically connected to the semiconductor lasers 2, 3, 12, and 13 and has a laser driver circuit. Reference Symbols 5 and 15 denote BD sensors as synchronization detecting means provided on the electric circuit substrate 4. The BD sensors 5 and 15 each detect a light flux reflected by the polygon mirror 10 and outputs a synchronization signal in a main scanning direction to thereby adjust scanning start timing at an end of an image. The lens barrel holding portions 11a and 11b are provided so as to slant the optical axes such that the light paths of the semiconductor lasers 12 and 13 intersect each other in a sub-scanning direction at a given angle θ. The contours of the lens barrels are partially integrated with each other. This makes it possible to hold the semiconductor lasers 12 and 13 across a short distance from each other. Diaphragm portions 11c and 11d are provided at the tips of the lens barrel holding portions 11a and 11b for the semiconductor lasers 12 and 13, respectively, and shape light fluxes emitted from the semiconductor lasers 12 and 13 into desired, optimum, beam shapes. Provided at the tips of the lens barrel holding portions 11a and 11b beyond the diaphragm portions 11c and 11d in the main scanning direction are bonding portions 11e and 11f of collimator lenses 16 and 17. The collimator lenses 16 and 17 convert light fluxes that have passed through the diaphragm portions 11c and 11d into approximately parallel pencils of light. The collimator lenses 16 and 17 are adjusted in irradiation position and in pint in the same manner as in the case of the collimator lenses 6 and 7, and are bonded and fixed to the bonding portions 11e and 11f.

To place a BD slit portion 11g of the laser holder 11 opposite to the laser holder 1 and to place the BD slit portion 1g of the laser holder 1 opposite to the laser holder 11, the laser holder 11 is placed on the same face of the optical case 40 such that, with the laser holder 1 rotated by 180°, the semiconductor laser 12 sits next to the semiconductor laser 3 and the semiconductor laser 13 adjoins to the semiconductor laser 2. As a result, the distance in the main scanning direction between the semiconductor lasers 2 and 3 and the semiconductor lasers 12 and 13 can be set short to suit a reflection face of the polygon mirror 10 which reflects light toward a scanning optical system that is opposed to the polygon mirror 10. In this way, the polygon mirror 10 makes it possible to scan a wide angle also when the semiconductor lasers 2, 3, 12, and 13 are placed in the same direction, and accordingly can shorten the light path length of the scanning optical system. In addition, since there are no optical parts for light incidence on the wall opposite to the laser holders 1 and 11 across the polygon mirror 10, the scanning optical device can be reduced in size by bringing this wall close to the polygon mirror 10.

The laser holder 11 is positioned with respect to the optical case 40 in a manner similar to positioning of the laser holder 1. Accordingly, the semiconductor lasers 12 and 13 can be positioned with high precision relative to the optical parts housed in the optical case 40.

The semiconductor lasers 2 and 3 and the semiconductor lasers 12 and 13 are held by press fit in the lens barrel holding portions 1a and 1b of the laser holder 1 and in the lens barrel holding portion 11a and 11b of the laser holder 11 such that a common signal is shared within them. This enables the electric circuit substrate 14 to form a signal pattern with the common signal set at the center, and thus makes it easy to design a signal pattern. In addition, the fact that the laser holder 11 is completely identical to the laser holder 1 in every aspect including holding identical parts, facilitates assembly and management in manufacture of the laser holders and has an effect of lowering cost. Furthermore, the number of parts and cost can be reduced since the semiconductor lasers 2, 3, 12, and 13 and the BD sensors 5 and 15 are placed on the same electric circuit substrate 14. Moreover, the electric circuit substrate 14 placed outside of the optical case 40 can be reduced in size and the scanning optical device can accordingly be made smaller in size.

Reference Symbol 18 denotes a cylindrical lens having a given refractive power only in the sub-scanning direction. The cylindrical lens 18 has unitarily formed lens portions 18a and 18b to handle light fluxes emitted from the semiconductor lasers 12 and 13, respectively. Reference Symbol 19 represents a BD lens for imaging, on a light receiving face of the BD sensor 15, light fluxes that have been reflected again by a reflector mirror 20 after being reflected by the polygon mirror 10. Placed right in front of the BD sensor 15 is a BD slit portion 11g, which is opened in the laser holder 11. The BD slit portion 11g is an opening that is narrow in the main scanning direction and long in the sub-scanning direction, so that light fluxes in the main scanning direction can be detected with high precision by restricting a light flux received by the BD sensor 15 to the main scanning direction. In this embodiment, the BD sensor 15 and the BD slit portion 11g are positioned to correspond to the semiconductor laser 12 and there is no BD sensor that is associated with the semiconductor laser 13. This is because the semiconductor lasers 12 and 13 are provided in the single laser holder 11 in the sub-scanning direction and accordingly are identical to each other in terms of scanning start timing at an end of an image.

Light fluxes emitted from the semiconductor lasers 12 and 13 are run as the irradiation light beams E3 and E4 on the photosensitive drums 913 and 914. The beams E3 and E4 after run for deflection scanning by the polygon mirror 10 behave as the irradiation light beams E1 and E2 do, until imaged on the photosensitive drums 91. Therefore, instead of repeating the description on this part, the part where fluxes of laser light are emitted from the semiconductor lasers and then received by the BD sensor 15 is described.

Light fluxes emitted from the semiconductor lasers 12 and 13 are limited in size in cross sectional area of the flux by the diaphragm portions 11c and 11d of the laser holder 11, and then converted into approximately parallel pencils of light by the collimator lenses 16 and 17 before entering the lens portions 18a and 18b of the cylindrical lens 18. Of the light fluxes incident on the cylindrical lens 18, a component within the main scanning cross-section is transmitted as it is whereas a component within the sub-scanning cross-section is converged to form an approximately linear image on the same face of the polygon mirror 10. At this point, the light enters obliquely at the angle θ in the sub-scanning direction. Then, the polygon mirror 10 is rotated for deflection scanning, causing the laser beams to exit in the sub-scanning-direction at the angle θ. Of the two light fluxes that have exited the polygon mirror 10, the light flux emitted from the semiconductor laser 12 and reflected by the polygon mirror 10 is reflected again by the reflector mirror 20 and is then received by the BD sensor 15 through the BD slit portion 11g provided in the laser holder 11. The BD slit portion 11g restricts the light flux to the main scanning direction, thereby making it possible to detect a light flux in the main scanning direction with high precision. The BD sensor 15 detects the light flux emitted from the semiconductor laser 12 and outputs a synchronization signal to adjust the scanning start timings by the semiconductor lasers 12 and 13 at an end of an image. The scanning start timing by the semiconductor laser 13 at an end of an image can be identical to the scanning start timing by the semiconductor laser 12 at an end of an image since the semiconductor lasers 12 and 13 are provided in the single laser holder 11 in the sub-scanning direction.

As described above, the BD slit portion 11g of the laser holder 11 is placed opposite to the laser holder 1 and the BD slit portion 1g of the laser holder 1 is placed opposite to the laser holder 11, and the laser holder 11 and the laser holder 1 are placed on the same face of the optical case 40. As a result, the distance in the main scanning direction between the semiconductor lasers 2 and 3 and the semiconductor lasers 12 and 13 can be set short to suit the reflection face of the polygon mirror 10 which reflects light toward the scanning optical system that is opposed to the polygon mirror 10. Therefore, the polygon mirror 10 makes it possible to scan a wide angle also when the semiconductor lasers 2, 3, 12, and 13 are placed in the same direction, and accordingly can shorten the light path length of the scanning optical system. In addition, since there are no optical parts for light incidence on the wall opposite to the laser holders 1 and 11 across the polygon mirror 10, the scanning optical device 200 can be reduced in size by bringing this wall close to the polygon mirror 10.

Furthermore, the number of parts and cost can be reduced since the semiconductor lasers 2, 3, 12, and 13 and the BD sensors 5 and 15 are placed on the same electric circuit substrate 14. Moreover, the electric circuit substrate 14 placed outside of the optical case 40 can be reduced in size and the scanning optical device can accordingly be made smaller in size.

The scanning optical device 100 of Embodiment 1 employs a method in which two fluxes of laser light enter one polygon mirror on each side to expose four photosensitive drums to light. However, this is not to limit the present invention and the scanning optical device 100 can also employ other methods including: a method in which four fluxes of laser light enter one side of a polygon mirror to expose four photosensitive drums to light; and a method in which two scanning optical devices are used, each of which has two fluxes of laser light incident on one side of a polygon mirror, to expose four photosensitive drums to light. Every semiconductor laser employed in the scanning optical devices 100 and 200 of Embodiments 1 and 2 is the type that has one light emission point in one housing. Instead, the scanning optical devices 100 and 200 may employ a semiconductor laser that has plural light emission points in one housing and, in this case, the number of scanning lines for operating photosensitive drums increases proportionately, which makes the scanning devices suitable for even faster writing. In the laser holder 1, the collimator lenses 6 and 7 are adjusted in irradiation point and in pint direction and bonded after the semiconductor lasers 2 and 3 are held by press fit. In an alternative case, the collimator lenses 6 and 7 are attached first by fitting them in fitting portions that are provided in the laser holder 1, and then the semiconductor lasers 2 and 3 are adjusted in irradiation point and in pint direction and bonded while optical characteristics of laser light are being detected. The BD sensor 15 is placed on the electric circuit substrate 14 in the scanning optical device 200 of Embodiment 2. However, this is not to limit the present invention, and the BD sensor 15 may be placed somewhere else in the optical case 40 where the BD sensor 15 can receive a light flux that has been reflected by the polygon mirror 10 instead of the reflector mirror 20.

Embodiments of the present invention have been described above, but note that the present invention is not limited thereto and that any modification is possible as long as it is within the technical concept.

What is claimed is:

1. A light scanning apparatus comprising:
a first lens barrel portion, which holds a first laser element emitting a first laser beam;
a second lens barrel portion, which holds a second laser element emitting a second laser beam,
wherein an optical axis of the first laser beam and an optical axis of the second laser beam are oriented in directions intersecting with each other so that a beam-to-beam distance between the first laser beam and the second laser beam gets shorter, and
wherein a part of a side wall of said second lens barrel portion is shared with a part of a side wall of said first lens barrel portion;
a first lens provided at a tip of said first lens barrel portion;
a second lens provided at a tip of said second lens barrel portion;
plural lens supporting portions, which support parts of circumferential surfaces of said first and second lenses, except at a position in which the circumferential surfaces of said first and second lenses are close to each other; and
a rotary polygonal mirror positioned for common scanning of first and second laser beams respectively emitted from said first and second laser elements.

2. A light scanning apparatus according to claim 1, wherein said first and second lenses are bonded to said tens supporting portions.

3. A light scanning apparatus according to claim 1, wherein said first and second laser elements are fixed to a common electric substrate.

4. A light scanning apparatus according to claim 1, wherein laser beams emitted from said first and second laser elements have an inclination relationship with each other so as to come close to each other.

5. A light scanning apparatus according to claim 1, further comprising an optical case which houses said first and second lens barrel portions and said rotary polygonal minor.

* * * * *

UNITED STATES PATENT AND TRADEMARK OFFICE
CERTIFICATE OF CORRECTION

PATENT NO. : 7,321,380 B2 Page 1 of 1
APPLICATION NO. : 10/791902
DATED : January 22, 2008
INVENTOR(S) : Kazuyuki Iwamoto It is certified that error appears in the above-identified patent and that said Letters Patent is hereby corrected as shown below:

COLUMN 8
Line 30, "before" should read --before being--; and
Line 53, "in provided" should read --1n provided--.

Signed and Sealed this

Second Day of September, 2008

JON W. DUDAS
*Director of the United States Patent and Trademark Office*